Patented May 5, 1931

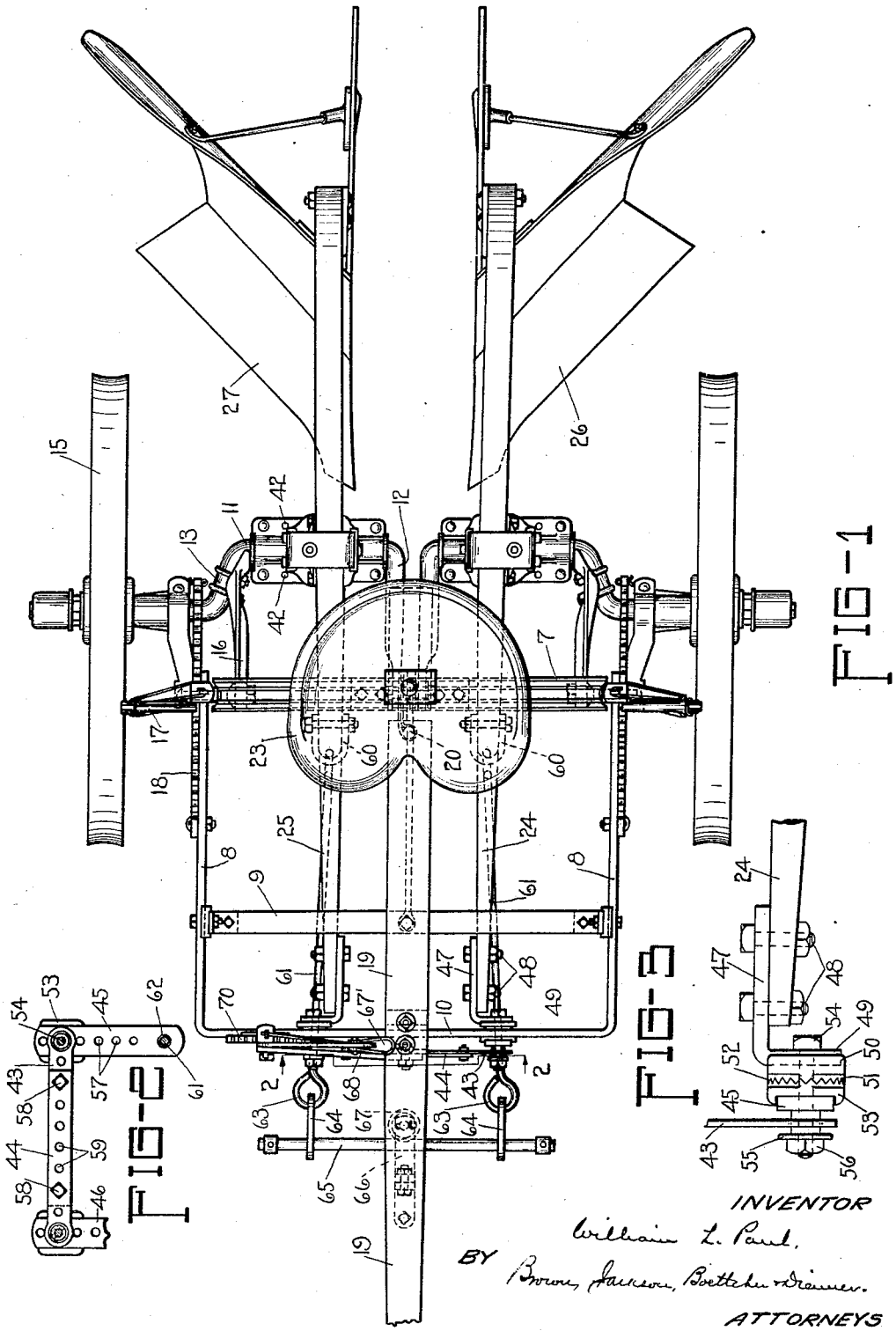

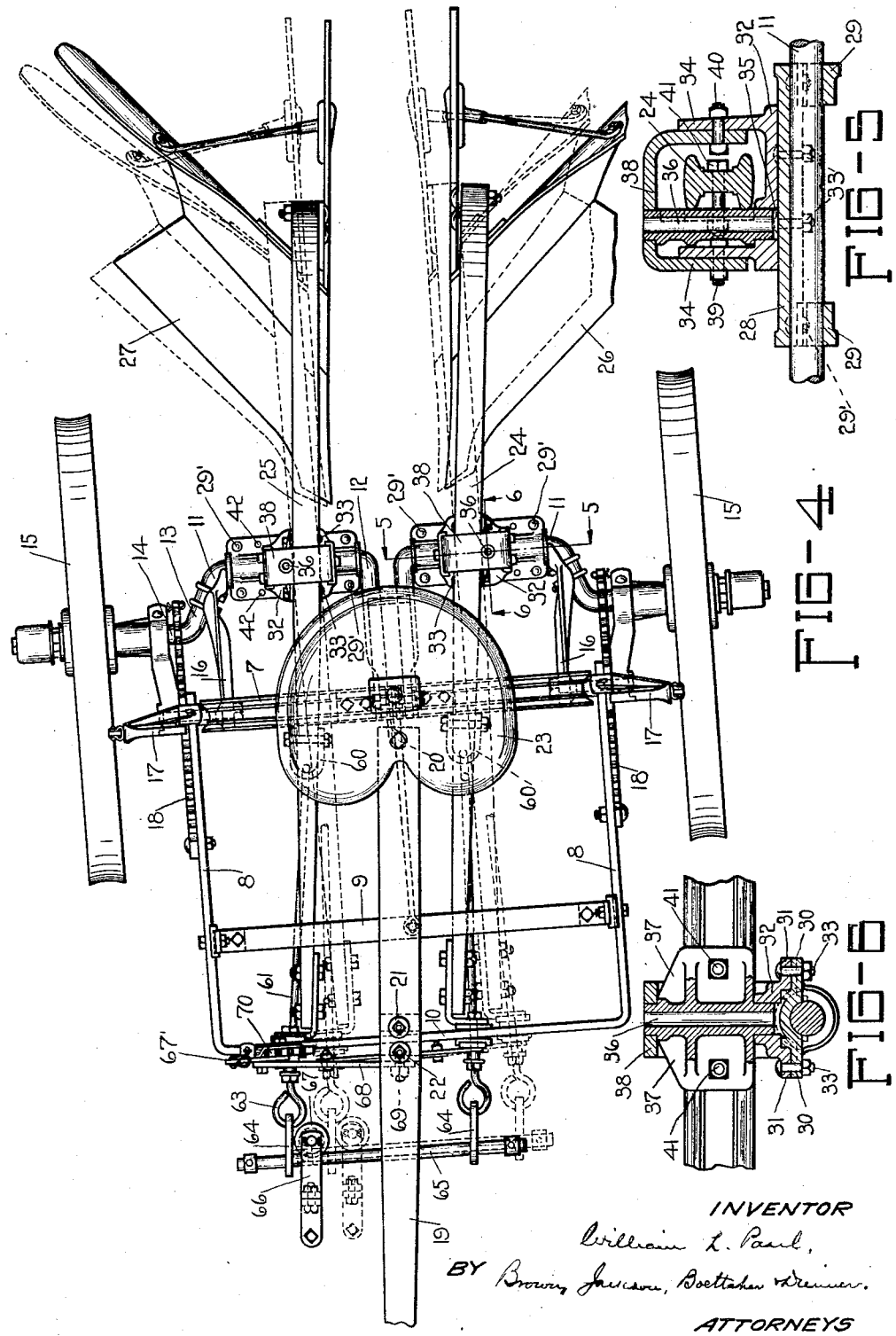

1,804,112

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

PLOW

Application filed February 13, 1929. Serial No. 339,549.

This invention relates to what are generally known as two-way plows. Such plows usually comprise a suitable wheel supported frame or carriage upon which are mounted two plow beams provided respectively with oppositely disposed plow bottoms, so that they turn the furrow slice outwardly in opposite directions, or away from each other. Patent to Charles H. Melvin, No. 1,160,743, dated November 16, 1915, shows and describes a well-known plow of this type, and for the purposes of this application I have shown my improvements embodied in a plow in which the frame structure and the lifting devices are substantially the same as the corresponding parts shown and described in said patent. My present invention constitutes an improvement in several respects upon a plow of that type, the nature of which will presently be set forth.

In the use of two-way plows, particularly on hill-side work, the soil is turned down hill, and the wheels have a tendency to run down hill, which makes it difficult to plow a regular furrow. To offset this tendency, it is customary to "cramp" the wheels slightly up hill, but with the constructions heretofore used, in which the plow beams are rigidly secured to the frame against lateral swinging with respect thereto, and the wheels are not capable of swinging laterally with respect to the frame, such cramping of the wheels deflects the beam of the operating plow laterally with respect to the line of draft to the same extent that the wheels are angled to such line, which is undesirable because to work to the best advantage the beam of the operating plow bottom should be maintained in a position of substantial parallelism with the line of draft. To provide a construction by which the beam of the operating plow may maintain such parallel position notwithstanding the angling or cramping of the wheels is one of the objects of this invention.

In two-way plows it is also desirable to so mount the plow bottoms that they may be conveniently adjusted with reference to each other to vary the spacing between them, and also to provide for adjusting the draft connections to accommodate such adjustments in the spacing of the plows, and another object of my invention is to provide for such adjustments. A further object is to provide draft connections that may be adjusted to accommodate changes in the number of draft animals, and to regulate the depth of plowing.

These several objects are accomplished by the improved construction hereinafter described. What I regard as new is set forth in the claims.

In the accompanying drawings,—

Fig. 1 is a plan view of my improved plow, showing the parts in the position they assume when both plow bottoms are lowered when the plow is resting on a plane surface, and with the ground wheels parallel with the beams and tongue;

Fig. 2 is a detail illustrating the link devices by which the front ends of the beams are held in spaced relation to each other and the position of the draft connections is controlled;

Fig. 3 is a detail illustrating the securing devices for said links;

Fig. 4 is a plan view of the plow with the plow bottoms lowered as in Fig. 1 showing the wheels cramped toward the left with the pole and plow beams in substantial parallelism with the line of draft;

Fig. 5 is a vertical cross-section on line 5—5 of Fig. 4, illustrating the devices for mounting the beams on the frame structure; and Fig. 6 is a view of the same parts taken on line 6—6 of Fig. 4.

So far as the frame structure considered apart from the devices for mounting the plow beams upon it is concerned, it may be substantially like that shown in said Melvin patent, to which reference is made for an explanation of the details of its construction. For the purposes of this application it will suffice to say that it comprises a central arched member 7 having a forwardly extending rectangular frame member 8 secured to the end portions thereof, said frame member being provided with a transverse brace 9, which is preferably U-shaped and is located at some suitable intermediate point between the arched member 7 and the front transverse bar 10 of the frame member 8, as best shown in Fig. 4.

Back of the arched member 7 are mounted two crank axles that are alike, but are oppositely mounted on the frame. Each of these crank axles comprises a central arch portion 11, an inner arm 12 that extends toward the lower portion of the arched member 7 and is pivotally connected therewith so that the arch portion 11 may swing in a vertical plane, and an outer arm 13 that is inclined with reference to the arch portion 11 and carries an outwardly extending axle spindle 14 upon which is mounted one of the ground wheels 15. As these two crank axles are alike their corresponding parts are indicated by the same reference numerals. Adjacent to the outer end of each arch portion 11 the axle is pivotally connected with the arched member 7 by an arm 16, thus providing an outer swinging support that cooperates with the arm 12 to support the crank axle from the arched member 7 so that it may swing up and down while its arch portion 11 is maintained parallel with the arch member 7. A lever 17 is loosely mounted on each spindle 14 and has fixed to it a bracket that is pivoted to the adjacent end portion of the arched member 7, as described in said Melvin patent, so that by actuating said lever the crank axle may be swung up or down to raise or lower the plow connected with it, and also raise or lower the adjoining ground wheel. A notched sector 18 is secured to the machine frame and is adapted to cooperate with suitable latch mechanism on the lever 17 to lock the lever in its different positions of adjustment.

It will be understood that by operating either lever 17 the plow controlled by it may be moved into or out of operative position, and that if desired provision may be made in any suitable way for rocking the crank axles 11 by the force of the draft, such, for example, as the construction shown for that purpose in said Melvin patent. A forwardly extending tongue 19 is provided, which is pivotally connected with the frame adjacent to its rear end by a vertical pivot 20 and extends over the front bar 10 of the frame member 8. Preferably a U-shaped bracket is secured by bolts 21, 22, to the under side of the tongue, in which the front bar 10 may slide when the tongue is turned to an angular position with reference to the wheels and the frame portion 8, as illustrated in Fig. 4. The driver's seat is mounted centrally on the arched member 7 of the frame, as shown at 23. The parts as thus far described are old and separately considered are not of my invention.

As best shown in Figs. 1 and 4, two plow beams 24, 25 are provided, which carry plow bottoms 26, 27, respectively. These plow bottoms are arranged to turn the soil outwardly in opposite directions, as usual in two-way plows. The plow beams are mounted respectively on the arched portions 11 of the two crank axles, preferably at a point a short distance in advance of the front end of the share, and the front ends of the beams, which are parallel with each other, are connected together by adjustable links, so that they are held in parallelism, as will be hereinafter specifically described.

Each of the plow beams is mounted upon the arch portion that supports it by a swivel connection of such character as to permit the beam to turn laterally to a position of greater or less angularity to the ground wheels and the members 7 and 8 of the frame, thus permitting the wheels to be cramped without affecting the position of the plow beams. This swivel mounting, which is best shown in Figs. 5 and 6, preferably comprises a base member 28, having half bearings 29 secured to its ends by bolts 29', to embrace the portion 11 of the crank axle. Said base member is provided with oppositely extending marginal flanges 30, best shown in Fig. 6, and upon said flanges rest the corresponding marginal flanges 31 of a pedestal 32 that is supported by the base 28. Bolts 33 secure these parts firmly together. The pedestal 32 is provided with parallel upright flanges 34 that extend transversely of the base 28 and are spaced apart, as best shown in Fig. 5, and adjacent to the inner side of the flange 34 it is provided with a socket 35 adapted to receive and form a bearing for the lower end of a vertical pivot 36 provided with oppositely extending wings 37, as best shown in Fig. 6. The upper end of the pivot 36 is pivotally supported by an inverted U-shaped bracket or yoke 38, the downwardly projecting ends of which overlap the flange 34 of the pedestal and are secured thereto by bolts 39, 40. As shown in Figs. 5 and 6, the upper horizontal portion of the yoke 38 is provided with a hole to receive and form a bearing for the upper end of the pivot 36, so that such pivot is firmly supported in an upright position but is free to turn in its bearings.

The plow beam 24, which is preferably of I cross-section, extends through the yoke 38 between the pivot 36 and one of the depending ends of said yoke, as shown in Fig. 5, and is clamped to the wings 37 of the pivot 36 by bolts 41, as best shown in Fig. 6. It will be evident that by this construction the beam is swiveled to the arch portion 11 of the crank axle that supports it, so that it may turn about the vertical axis provided by the pivot 36. Furthermore, by shifting the position of the pedestal with respect to the base 28 lengthwise of the arch portion 11, the position of the beam, transversely, with respect to the arch portion 11, may be adjusted to vary the spacing between the two beams.

To provide for this adjustment, the flanges 30 of the base 28 are provided with a series of holes 42 adapted to receive the bolts 33, so that to change the spacing of the beams it is only necessary to remove said bolts and after sliding the pedestal along on the base place the bolts in the appropriate holes.

The forward ends of the beams are connected together to hold them in parallelism with each other by overlapping links 43, 44 connected respectively to the front end portions of the two beams, as best shown in Figs. 1 and 2, and with these links are associated depending links 45, 46 that support and position the draft connections. As shown in Fig. 1, the front end of the beam 24 is provided with a bracket 47, the rear portion of which overlaps the beam end and is secured thereto by bolts 48. The front portion of said bracket is bent outwardly at right angles as shown at 49 and fits in a groove in the rear surface of a clamp member 50, the opposite face of which is serrated as shown at 51.

Engaging this serrated surface is a similar surface 52 of a second clamp member 53 provided with a groove in its forward or outer surface which receives the upper end portion of the link 45. A bolt 54 extends through the bracket arm 49, the two clamp members 50, 53 and the link 45, and also through a thimble 55 mounted on the forward end of said bolt. A nut 56, secured on the latter end of said bolt, binds these parts tightly together. Obviously, by loosening the nut 56 the clamp members 50, 53 may be separated to permit the clamp member 53 to be rotated with reference to the clamp member 50 for the purpose of adjusting the position of the link 45 with reference to a vertical plane, that is to say, to permit the lower end of said link to be swung laterally. The link 46 at the opposite side of the plow is supported in a similar manner from the forward end of the beam 25. By this means therefore, the lower ends of said links may be swung toward and from each other and may be firmly secured in their different positions of adjustment. Furthermore, each of said links is provided with a series of holes 57 along its length so that said links may be vertically adjusted with respect to the bolts 54 by which they are secured. The outer ends of the links 43, 44 are mounted on the thimbles 55, as shown in Figs. 2 and 3, and they are secured together by bolts 58 passing through registering holes 59 in said links. Each of said links is provided with a number of holes 59 so that they may be adjusted longitudinally with respect to each other to vary the spacing between the forward ends of the plow beam to correspond to variations in the spacing of the swivel mountings thereof.

Secured to the plow beams, preferably by clevises 60, are draft rods 61, the forward portions of which pass through holes 62 in the lower portions of the links 45, 46, as best shown in Fig. 2, so that said draft rods are supported and positioned by said links. At their forward ends the draft rods 61 are provided with eyes 63 which carry links 64 that embrace a transverse draft bar 65, and are free to slide longitudinally of said bar, which is preferably cylindrical. Mounted on said bar between the links 64 is a clevis link 66 preferably provided with a roller 67 that runs on the rear surface of said bar, as shown in Fig. 4. The clevis link 66 provides a connection for the doubletrees by which the draft animals are attached to the implement.

As has been explained, the rear end of the tongue 19 is pivotally connected with the implement frame, and to provide for angling said frame with respect to the tongue so that the wheels may be cramped when desired, a lever 67' is mounted on the front bar 10 of the frame to swing transversely, and is connected by a link 68 with the tongue, preferably by a bolt 69. A notched sector 70 is also mounted on the frame bar 10 and cooperates with a latch on the lever 67' to lock said lever in its different positions of adjustment. Thus, by operating said lever, the machine frame may be swung transversely with respect to the tongue to change the angular position of the ground wheels relatively to the line of draft, but without moving the front ends of the beams relatively to the tongue.

As shown in Fig. 4, the forward ends of the plow beams extend under the transverse brace 9, so that said brace serves to limit their upward movement when the plows are raised, thus permitting the plow bodies to be lifted higher than the front ends of the beams.

From the foregoing description it will be seen that the plow beams are free at all times to maintain their parallelism with the line of draft, under the force of the draft, but the implement frame and the ground wheels may be adjusted independently of the beams to angle or cramp the wheels with respect to the line of draft, to such extent as may be desired. To accommodate the draft devices for the attachment of a greater or less number of draft animals the links 45, 46 may be swung transversely to position their lower ends closer together or farther apart, and may be secured in their adjusted position, and likewise the links 43, 44 may be adjusted to properly space the front ends of the beams apart according as the rear portions of the beams may be spaced by the adjustment of the swivel connections thereof. The links 45, 46 may also be adjusted vertically with respect to the front ends of the beams, to raise or lower the draft rods 61 and thereby regulate the depth of plowing. The operation of the plow in other respects is in accordance with well understood practice.

I claim:

1. In a plow adapted to be propelled by draft means, the combination with a frame, wheels supporting said frame, lifting means on said frame, and means operable to angle the frame with respect to the line of draft, of a plow comprising a beam having a swivel connection with said frame to rock laterally with respect thereto, and connected with said lifting means to be raised or lowered by the operation thereof, and draft connections on said beam.

2. In a plow, the combination with a frame, wheels supporting said frame, a tongue pivotally connected with said frame to swing laterally with respect thereto, plow lifting means on said frame, and means operable to angle the frame with respect to the tongue, of a plow comprising a beam having a swivel connection with said frame to rock laterally with respect thereto, and connected with said lifting means to be raised or lowered by the operation thereof, and draft means connected with said beam.

3. In a plow adapted to be propelled by draft means, the combination with a frame, wheels supporting said frame, plow lifting means mounted on said frame to swing vertically about a transverse axis, and means operable to angle the frame with respect to the line of draft, of a plow comprising a beam having a swivel connection with said lifting means to rock laterally with respect to said frame, and draft connections on said beam.

4. In a plow adapted to be propelled by draft means, the combination with a frame, wheels supporting said frame, plow lifting means on said frame, and means operable to angle the frame with respect to the line of draft, of a plow comprising a beam having a transversely adjustable swivel connection with the frame and adapted to be raised or lowered by the operation of said lifting means, and draft connections on said beam.

5. In a plow adapted to be propelled by draft means, the combination with a frame, wheels supporting said frame, plow lifting means mounted on said frame to swing vertically about a transverse axis, and means operable to angle the frame with respect to the line of draft, of a plow comprising a beam, a swivel connection connected with said beam and having a transversely shiftable connection with said lifting means, and draft connections on said beam.

6. In a two-way plow adapted to be propelled by draft means, the combination with a frame, wheels supporting said frame, separately operable plow lifting devices at opposite sides thereof, and means operable to angle the frame with respect to the line of draft, of oppositely acting plows comprising beams movably supported by said frame to be respectively raised or lowered by the operation of said lifting devices and to maintain a position of substantial parallelism with the line of draft, under the force of the draft, independent of angling of said frame, means for holding the forward ends of said beams in spaced relation to each other, and raft connections on said beams.

7. In a two-way plow adapted to be propelled by draft means, the combination with a frame, wheels supporting said frame, separately operable plow lifting devices at opposite sides of said frame, and means operable to angle the frame with respect to the line of draft, of oppositely acting plows comprising beams each having a swivel connection with said frame to rock laterally with respect thereto, and connected with said lifting devices to be respectively raised or lowered by the operation thereof, means for holding the forward ends of said beams in spaced relation to each other, and draft connections on said beams.

8. In a two-way plow adapted to be propelled by draft means, the combination with a frame, wheels supporting said frame, separately operable plow lifting devices at opposite sides of said frame, and means operable to angle the frame with respect to the line of draft, of oppositely acting two-way plows comprising beams, a swivel connection between each of said beams and one of said lifting devices, said connections being adjustable transversely of the frame, means adjustably connecting the forward ends of said beams in spaced relation to each other, and draft connections on said beams.

9. In a two-way plow adapted to be propelled by draft means, the combination with a frame, wheels supporting said frame, plow lifting devices at opposite sides of said frame each comprising an arched member adapted to swing vertically about a transverse axis, and means operable to angle the frame with respect to the line of draft, of oppositely acting plows comprising beams, swivels connecting said beams respectively with said arched members to rock laterally with respect to said frame, means connecting the forward portions of said beams in spaced relation to each other, and draft connections on said beams.

10. In a two-way plow adapted to be propelled by draft means, the combination with a frame, wheels supporting said frame, plow lifting devices at opposite sides of said frame each comprising an arched member adapted to swing vertically about a transverse axis, and means operable to angle the frame with respect to the line of draft, of oppositely acting plows comprising beams, swivels connected with said beams respectively and connected with said arched members for adjustment transversely of the frame, means adjustably connecting the forward portions of said beams in spaced relation to each other, and draft connections on said beams.

11. In a plow adapted to be propelled by draft means, the combination with a frame, wheels supporting said frame, and means operable to angle the frame with respect to the line of draft, of a lifting member mounted on said frame to swing about a transverse axis, a base mounted on said lifting member, a pedestal mounted on said base, an inverted yoke secured to said pedestal, a vertical pivot pivotally mounted between said pedestal and yoke, a plow beam secured to said pivot, and draft connections on said beam.

12. In a plow adapted to be propelled by draft means, the combination with a frame, wheels supporting said frame, and means operable to angle the frame with respect to the line of draft, of a lifting member mounted on said frame to swing about a transverse axis, a base mounted on said lifting member, a pedestal mounted on said base and adjustable thereon tranesversely of the frame, an inverted yoke secured to said pedestal, a vertical pivot pivotally mounted between said pedestal and yoke, a plow beam secured to said pivot, and draft connections on said beam.

13. In a plow, the combination with a frame, wheels supporting said frame, a tongue pivotally connected with said frame to swing laterally with respect thereto, plow lifting means on said frame, and transversely swinging lever mechanism connecting the forward portion of the frame and the tongue and operable to angle the frame with respect to the tongue, of a plow comprising a beam having a swivel connection with said frame to rock laterally with respect thereto, and connected with said lifting means to be raised or lowered by the operation thereof, and draft means connected with said beam.

14. In a two-way plow adapted to be propelled by draft means, the combination with a frame, wheels supporting said frame, separately operable plow lifting devices at opposite sides of said frame, and means operable to angle the frame with respect to the line of draft, of oppositely acting plows comprising beams, a swivel connection between each of said beams and one of said lifting devices, said connections being adjustable transversely of the frame, means for holding the forward ends of said beams in spaced relation to each other, comprising transversely extending links connected with said beams respectively and adjustably connected with each other, vertically disposed links connected with said beams, and draft rods connected with said beams and supported by said vertically disposed links.

15. In a two-way plow adapted to be propelled by draft means, the combination with a frame, wheels supporting said frame, separately operable plow lifting devices at opposite sides of said frame, and means operable to angle the frame with respect to the line of draft, of oppositely acting plows comprising beams, a swivel connection between each of said beams and one of said lifting devices, said connections being adjustable transversely of the frame, means for holding the forward ends of said beams in spaced relation to each other, comprising transversely extending links connected with said beams respectively and adjustably connected with each other, vertically disposed links connected with said beams for swinging adjustment transversely of the frame, and draft rods connected with said beams and supported by said vertically disposed links.

16. In a two-way plow adapted to be propelled by draft means, the combination with a frame, wheels supporting said frame, separately operable plow lifting devices at opposite sides of said frame, and means operable to angle the frame with respect to the line of draft, of oppositely acting plows comprising beams, a swivel connection between each of said beams and one of said lifting devices, said connections being adjustable transversely of the frame, means for holding the forward ends of said beams in spaced relation to each other, comprising transversely extending links connected with said beams respectively and adjustably connected with each other, vertically disposed links connected with said beams for swinging adjustment transversely of the frame, draft rods connected with said beams and supported by said vertically disposed links, a tongue pivotally connected with the frame to swing transversely, and lever mechanism connecting the forward portion of said frame with said tongue and operable to angle the frame with respect to the tongue.

17. A plow comprising, in combination, a frame, wheels supporting said frame, plow lifting means on said frame, a plow beam pivoted to the frame to swing both vertically and horizontally relative to the frame and operatively connected with the lifting means, a draft connection secured to the forward end of said beam whereby the plow beam is adapted to maintain a position of substantial parallelism with the line of draft, and means to control the position of the frame relative to the plow beam and the line of draft.

18. A plow comprising, in combination, a frame, wheels supporting said frame, plow lifting means on said frame, a plow beam pivoted to the frame intermediate its ends and adapted to swing about a substantially vertical axis, a draft connection near the forward end of the beam, adjustable means to control the angular position of the frame relative to the beam, and means connecting the lifting means with the beam.

19. A plow comprising, in combination, a frame, wheels supporting the frame, a plow beam pivoted to the frame to swing about a vertical axis spaced forwardly from the rear end of the beam, a draft connection at the forward end of the beam, and means to swing the frame and wheels relative to the plow beam.

20. A plow comprising, in combination, a frame, crank axles supported thereon, wheels supporting the frame and journaled on the axles, a plow beam pivoted to one of the axles to swing about a vertical axis spaced forwardly from the rear end of the beam, a draft connection at the forward end of the beam, lifting means adapted to swing said one crank axle to raise the plow beam, and means to swing the frame and wheels relative to the plow beam.

WILLIAM L. PAUL.